(12) United States Patent
Turnock et al.

(10) Patent No.: US 10,089,118 B2
(45) Date of Patent: Oct. 2, 2018

(54) SYSTEM FOR CONNECTING A DISPLAY OVER A GENERAL-PURPOSE DATA TRANSPORT

(71) Applicant: DisplayLink (UK) Limited, Cambridge (GB)

(72) Inventors: Martin Andrew Turnock, Brixton (GB); Timothy Mark Edmonds, Castenlnau-le-Lez (FR); Patrick David Cooper, Cambridge (GB)

(73) Assignee: DISPLAYLINK (UK) LIMITED (GB)

( * ) Notice: Subject to any disclaimer, the term of this patent is extended or adjusted under 35 U.S.C. 154(b) by 358 days.

(21) Appl. No.: 14/888,863

(22) PCT Filed: Apr. 30, 2014

(86) PCT No.: PCT/GB2014/051348
§ 371 (c)(1),
(2) Date: Nov. 3, 2015

(87) PCT Pub. No.: WO2014/177869
PCT Pub. Date: Nov. 6, 2014

(65) Prior Publication Data
US 2016/0077842 A1   Mar. 17, 2016

(30) Foreign Application Priority Data
May 3, 2013   (GB) .................... 1308085.8

(51) Int. Cl.
*G06F 9/44* (2018.01)
*G06F 9/4401* (2018.01)
*G06F 13/10* (2006.01)
*G06F 13/38* (2006.01)

(52) U.S. Cl.
CPC .......... *G06F 9/4411* (2013.01); *G06F 9/4406* (2013.01); *G06F 13/10* (2013.01); *G06F 13/385* (2013.01)

(58) Field of Classification Search
CPC ....... G06F 9/4411; G06F 13/10; G06F 13/385
See application file for complete search history.

(56) References Cited

U.S. PATENT DOCUMENTS

| 7,287,099 B1 | 10/2007 | Powderly et al. |
| 7,636,839 B2 * | 12/2009 | Lai ........................ G06F 9/4401 713/1 |
| 7,644,264 B1 * | 1/2010 | Olsen .................... G06F 9/4416 710/104 |

(Continued)

FOREIGN PATENT DOCUMENTS

| EP | 2037446 A2 | 3/2009 |
| JP | 2011026039 A | 2/2011 |
| WO | 2010/002396 A1 | 1/2010 |

OTHER PUBLICATIONS

"PCT Notification of the International Search Report and the Written Opinion of the International Searching Authority", dated Jun. 30, 2014 (Jun. 30, 2014), for International Application No. PCT/GB2014/051348, 10pgs.

(Continued)

*Primary Examiner* — Henry Tsai
*Assistant Examiner* — Christopher a Daley
(74) *Attorney, Agent, or Firm* — Buckley, Maschoff & Talwalkar LLC

(57) ABSTRACT

A system to enable a computer to provide output to a display over a general-purpose data transmission medium, such as USB. The system includes provision of a plurality of display interface components, each display interface component adapted to receive display data and transmission of the display data to the display via the general-purpose data transmission medium. Each component is associated with a respective stage of operation of the system. The system is configured to use a respective one of the display interface components during each of a plurality of distinct operational stages.

19 Claims, 7 Drawing Sheets

(56) References Cited

U.S. PATENT DOCUMENTS

| | | | |
|---|---|---|---|
| 8,490,116 B2* | 7/2013 | Ueltschey, III | G06F 9/45508 719/323 |
| 2003/0020719 A1 | 1/2003 | Abgrall | |
| 2003/0107600 A1 | 6/2003 | Kwong et al. | |
| 2004/0059900 A1* | 3/2004 | Backman | G06F 9/4416 713/1 |
| 2005/0172038 A1 | 8/2005 | Biggs et al. | |
| 2005/0193396 A1* | 9/2005 | Stafford-Fraser | G06F 3/1438 719/328 |
| 2008/0046613 A1 | 2/2008 | Lai et al. | |
| 2008/0291210 A1 | 11/2008 | Partani et al. | |
| 2009/0023475 A1* | 1/2009 | Chang | H04M 1/72527 455/557 |
| 2009/0125653 A1* | 5/2009 | Aytur | G09G 5/006 710/72 |
| 2009/0172707 A1* | 7/2009 | Huang | G06F 3/1423 719/327 |
| 2012/0017072 A1* | 1/2012 | Gillespie | G06F 3/14 713/2 |
| 2013/0124843 A1* | 5/2013 | Bobzin | G06F 21/575 713/2 |
| 2013/0286027 A1* | 10/2013 | Desselle | G09G 5/006 345/520 |
| 2014/0173264 A1* | 6/2014 | Barrett | G06F 9/4411 713/2 |

OTHER PUBLICATIONS

"VESA Net2Display Remoting Standard", Video Electronics Standards Association, Version 1, Oct. 22, 2009 (Oct. 22, 2009), (pp. 1-276), XP007917342.

* cited by examiner

SYSTEM FOR CONNECTING A DISPLAY OVER A GENERAL-PURPOSE DATA TRANSPORT

This application is a U.S. National Stage filing under 35 U.S.C. § 371 and 35 U.S.C § 119, based on and claiming priority to PCT/GB2014/051348 for "SYSTEM FOR CONNECTING A DISPLAY OVER A GENERAL-PURPOSE DATA TRANSPORT" filed Apr. 30, 2014, claiming priority to GB Patent Application No. 1308085.8 filed May 3, 2013.

The present invention relates to methods and systems for providing output to a display over a general-purpose data transport.

Computer displays utilise a variety of specialised connections such as VGA, DVI or HDMI connections, coupled to dedicated video hardware in order to output a display signal to a display. This need for dedicated connection hardware can increase the cost and complexity of computers.

Systems have been developed that allow connection of displays over certain other specialised types of connections. For example, the Thunderbolt interface combines transport of DisplayPort and PCIe express communications over a single connection, to enable a variety of peripheral devices to use a single port. However, specialised new hardware must be added to the computer to implement this interface.

Systems for connecting a display to a computer over USB are also available. Such systems generally use a software display driver loaded by the computer's operating system, which transmits display data over USB instead of via the standard display connection. However, the driver is dependent on other parts of the operating system's display driver stack, as well as the USB driver stack for the purposes of transmitting information over USB. Such systems can therefore generally only be used once the operating system is up and running. Some other display means is needed to interact with the computer outside the operating system, e.g. during the boot process. With this approach, a USB-connected display is thus generally only suitable for use as a secondary display.

The present invention seeks to alleviate some of these problems.

Accordingly, in a first aspect of the invention, there is provided a method of enabling a computer to provide output to a display over a general-purpose data transmission medium, the method comprising: providing a plurality of display interface components, each display interface component adapted to receive display data and transmit the display data via the general-purpose data transmission medium for output to the display, each display interface component associated with a respective stage of operation of the computer; and configuring the computer to use a respective one of the display interface components during each of a plurality of distinct operational stages.

This allows display output to be provided during multiple operational stages of the computer. Each operational stage preferably corresponds to a distinct software execution context, e.g. a context during which a distinct set of software services are available for use by software running in the computer (such as firmware services and operating system services). Preferably, the operational stages include at least an operating stage prior to boot of an operating system (e.g. a firmware context), and an operating stage after booting of the operating system (e.g. an operating system context). The operational stages may also include an operating stage during booting of the operating system. Different display interface components may thus handle display output to the general-purpose data transmission medium during each of those stages.

The term "operating stages" thus preferably refers to stages or phases of operation of the computer in relation to any or all of the following: the powering up/booting of a computer, booting of an operating system, running of the operating system (and applications within it) and shutting down the operating system and the computer. The operating stages may also include one or more stages of an OS installation process.

The general-purpose data transmission medium is preferably external to the computer, or includes a transmission channel that is external to the computer, for example in the form of an external cabled or wireless connection, with the data transmission medium providing a connection to a device that is separate and/or remote from the computer (e.g. via said external channel), e.g. to a display or display adapter connected to the display. The general-purpose data transmission medium is preferably a data transmission medium that is not specifically designed or intended for connection to a display. The transmission medium may include software (e.g. driver) components, hardware components (e.g. controller and connector/port hardware and interconnecting cables), or a combination of software and hardware components. The data transmission medium may include or be a software interface (or software stack) which itself handles data transport over an underlying physical connection medium external to the computer. The data transmission medium may be packet-based, and may be a peripheral connection bus such as USB, or an IP-based transmission channel (e.g. a TCP/IP channel such as a LAN or wireless LAN connection). In this context, the term "computer" preferably refers to a self-contained computing device including at least a processor, memory, one or more internal buses, and optionally one or more input/output controllers connected to the processor via the one or more internal buses, these components typically being housed in a computer enclosure. The computer preferably includes one or more external connectors/ports, including a connector/port for connection to the general-purpose transmission medium (or an external channel thereof).

Display interface components are preferably software components (e.g. executable code modules or libraries), for example in the form of drivers (e.g. firmware or operating system drivers). However, display interface components could optionally include hardware interface modules.

The display data may include pixel data. The display data may specify a complete display frame or one or more modified portions of a display frame. The display data may include metadata, such as data defining modified areas of a display frame, or display configuration data. A display interface component may be configured to modify the display data (e.g. convert or compress the data) prior to transmission. Outputting display data may include outputting the data to a software or hardware interface associated with the data transmission medium.

Configuring the computer may include configuring firmware, such as an extensible firmware interface, or an operating system to load a display interface component, e.g. as a display driver.

The invention also analogously provides in a further aspect a method of providing output to a display over a general-purpose data transmission medium, the method comprising: running, at each of a plurality of respective stages of operation of a computer, a respective display interface component, and receiving, by each display interface component during the associated operational stage, display data and transmitting the display data via the general-purpose data transmission medium for output to the display.

The invention also provides a computer program product and a computer system having means for (or configured for) carrying out any method as set out above. The following optional features may be applied to any of these aspects.

Preferably, the plurality of display interface components comprises a pre-OS display interface component associated with a stage of operation prior to booting of an operating system (OS). Operation of the computer is preferably under control of firmware during the pre-OS stage, the method preferably comprising configuring the firmware to use the pre-OS display interface component for outputting display data. The pre-OS stage may include operation of an OS loader (or an early part thereof). Thus, the pre-OS display interface component is preferably adapted to receive display data output by pre-OS code running on the computer, the pre-OS code preferably including one or both of: firmware code; and OS loader code.

The pre-OS display interface component preferably implements a firmware display interface or protocol, preferably Unified Extensible Firmware Interface (UEFI) Graphic Output Protocol (GOP). Thus, the component may take the form of a UEFI GOP driver. The pre-OS display interface component is preferably adapted to receive display data through calls to such a firmware display interface or API.

Alternatively or additionally, the pre-OS display interface component may be arranged to read display data from a framebuffer (e.g. periodically) and output the display data to the general-purpose data transmission medium.

The plurality of display interface components preferably further comprises one or more display interface components configured to interface with an operating system of the computer, e.g. during or after booting of the operating system. Such a display interface component may be arranged to receive display data from the operating system (or a process or application running within the operating system) via display API calls associated with a display API of the operating system or by reading from a framebuffer written to by the operation system/process/application.

The method may comprise providing a plurality of display interface components for use at respective stages of operation of an operating system of the computer, and configuring the operating system to output display data for transmission to the display using a selected one of said display interface components during each respective stage.

Preferably, the method comprises configuring the operating system to load a first display interface component during a first stage of booting the operating system, preferably prior to establishment of the operating system display driver stack, and to load a second display interface component during a second, subsequent stage of booting the operating system, preferably as part of establishing the operating system display driver stack.

The first display interface component is preferably configured to read display data from a framebuffer written to by the operating system and output the read display data to the general-purpose data transmission medium. The second display interface component is preferably configured to receive display data through calls to an operating system display API.

Advantageously, the display interface components may comprise one or preferably both of: a kernel mode display driver, configured to receive display data (e.g. from the operating system or associated applications or processes) prior to initialisation of a user mode of the operating system and output the display data to the general-purpose data transmission medium; and a user mode display service, configured to receive display data and output the display data to the general-purpose data transmission medium after initialisation of the user mode. The display interface components may further comprise a user mode display driver configured to receive display data from the operating system after initialisation of the user mode and to output the display data to the general-purpose data transmission medium using a selected one of the kernel mode display driver and the user mode display service in dependence on a current operational state of the operating system. This enables output to the general-purpose transmission medium to cover essentially the entire user mode initialisation stage (i.e. the transition from kernel mode driver to user mode service). The user mode display driver is preferably configured to output the display data to the kernel mode display driver prior to starting of the user mode display service, and to the user mode display service after starting of the user mode display service.

The method may comprise configuring the operating system to prioritise during booting of the operating system one or both of: loading of a selected one of the display interface components; and loading of one or more drivers associated with the general-purpose data transmission medium. The prioritising preferably includes modifying a driver load order, preferably so as to place one or more display interface components or data transmission medium drivers at an earlier point in a driver load order (compared to an existing or standard driver load order). This has the advantage of reducing a period during booting of the operating system when display output over the general-purpose data transmission medium is not available due to lack of drivers. The method may comprise configuring the operating system to place the display interface component and/or the data transmission medium driver(s) in a first (earliest) group of drivers processed by the operating system when loading drivers during boot.

The display interface components may include one or more display interface components adapted to operate during one or more stages of an operating system installation and/or configuration process.

The display interface components are preferably configured to output display data to a display adapter connected to the general-purpose data transmission medium, the display adapter configured to output a display signal to the display based on received display data. The method preferably comprises configuring the display adapter to maintain an output image on the display during transition from a first display interface component operating during a first operational stage to a second display interface component operating during a second operational stage, wherein the output image is preferably a static image during the transition and/or is an output image previously transmitted to the display adapter. The transition is preferably a transition involving an initialisation or reset of the data transmission medium or one or more components thereof. This can prevent a disruption to the display output during such an initialisation. The output image that is maintained by the adapter is preferably the last output image transmitted to or generated at the adapter prior to the initialisation.

This feature may also be provided independently. Accordingly, in a further aspect of the invention, there is provided a method of providing display output from a computer to a display adapter over a general-purpose data transmission medium, the display adapter associated with a display and arranged to receive display data over the data transmission medium and provide an output signal to the display based on the display data, the method comprising: prior to booting of an operating system of the computer, transmitting display data to the display adapter over the general-purpose data transmission medium by a display interface component associated with a firmware of the computer; configuring the display adapter to maintain a predetermined display output during an initialisation of the general-purpose data transmission medium occurring during booting of the operating system; and subsequent to the initialisation, transmitting display data to the display adapter over the general-purpose data transmission medium by a display interface component associated with the operating system.

The display adapter may form part of the display device, or may be a separate device connected to the display, preferably via a standard display connection.

The configuring is preferably performed by the display interface component associated with the firmware. The method may comprise, at the adapter, maintaining the predetermined display output during the initialisation. The predetermined display output preferably corresponds to a previous (preferably most recent) display output sent to the display adapter by the firmware display interface component, e.g. prior to termination of said component or prior to handover from said component to the display interface component associated with the operating system. The method preferably further comprises at the display adapter, subsequent to the initialisation, updating the display based on subsequently received display data.

The invention preferably also provides as independent aspects the parts of the above method performed respectively at the computer and the display adapter, as well as computer program products and devices having means for performing the respective parts of the method.

In a further aspect of the invention, there is provided a method of providing output to a display connected to a computer over a general-purpose data transmission medium, the method comprising: transmitting display data over the general-purpose data transmission medium to a display adapter, the display adapter arranged to receive the display data and output a display signal to the display based on the display data; in response to an operating system of the computer entering a fault mode, the fault mode including terminating operation of an operating system interface to the data transmission medium, transmitting prior to the terminating a fault indication to the display adapter over the general-purpose data transmission medium (e.g. using said interface); and in response to the fault indication, outputting by the display adapter a stored display image comprising information indicating occurrence of the fault.

This can enable a fault indication to be displayed to a user even though the data transmission medium is becoming unavailable (because the operating system is in the process of halting). The method preferably comprises transmitting the display image to the display adapter prior to entering the fault mode (e.g. by a display interface component as set out above), and storing the display image at the display adapter.

To ensure that the fault indication can be successfully transmitted, an amount of data used for transmitting the fault indication is preferably less than an amount of data of the stored display image and/or less than an amount of data used for transmitting the display image to the display adapter. The fault indication is preferably transmitted on the general-purpose data transmission medium using a single data packet.

The invention preferably also provides as independent aspects the parts of the above method performed respectively at the computer and the display adapter, as well as computer program products and devices having means for performing the respective parts of the method.

In any of the above aspects, the general-purpose data transmission medium preferably comprises a peripheral connection bus, preferably a Universal Serial Bus, USB. The display interface components preferably comprise one or more display interface components as set out below.

The invention also provides a computer system configured in accordance with any method as set out above and/or having means for performing any method as set out above, and a computer program or computer program product comprising software code adapted, when executed on a data processing apparatus, to perform any method as set out above.

In a further aspect of the invention, there is provided a display interface software component for transmitting display data from a computer to a display over a general-purpose data transmission medium, wherein the display interface component comprises: means for receiving display data intended for output to the display, the display data generated by code running prior to booting of an operating system of the computer (and/or prior to loading of a display driver used by the operating system); and means for outputting the display data to the general-purpose data transmission medium for transmission to the display.

The display interface software component is preferably arranged to implement a standard firmware display interface, the receiving means arranged to receive display data through calls to the interface. Preferably, the display interface software component is configured to implement an Extensible Firmware Interface (EFI), or Unified EFI (UEFI) display protocol. The display interface software component may be in the form of a UEFI Graphics Output Protocol (GOP) driver.

The receiving means may comprise means for reading display data from a framebuffer.

In a further aspect of the invention, there is provided a display interface software component for use by an operating system of a computer during a stage of operation of the operating system prior to establishment of the operating system display driver stack (that is used after boot) during which the operating system renders display output into a framebuffer without use of the display driver stack; the display interface software component comprising: means for reading display data from the framebuffer; and means for outputting the display data to the general-purpose data transmission medium for transmission to the display.

The following optional features may be applied to either of the above aspects. The reading means is preferably adapted to read display data from the framebuffer periodically. The framebuffer may be associated with a hardware display adapter. Alternatively, the display interface software component may comprise means for creating the framebuffer and making the framebuffer accessible to other software components in the computer. As set out above, the general-purpose data transmission medium is preferably not specially adapted for providing display data to a display, and preferably comprises a peripheral connection bus, preferably a Universal Serial Bus, USB. The outputting means is preferably arranged to output the display data to the USB via a USB interface provided by the computer's firmware or via an operating system USB driver. The outputting means preferably comprises means for converting and/or compressing the display data prior to transmission.

The display interface software component may comprise means for receiving information indicating one or more changed areas of a display frame, the outputting means adapted to output display data to the general-purpose data transmission medium only in respect of the changed areas, and may comprise means for generating the changed area information based on the received display data, preferably by comparing received display data to previous display data. This can reduce the amount of data that has to be transmitted.

The outputting means is preferably configured to transmit the display data to a display adapter connected to the data transmission medium, the display adapter arranged to output a display signal to the display based on the transmitted display data.

The means for performing various actions are preferably in the form of software code for execution by the computer. The invention also provides a computer-readable medium comprising software code for implementing a display interface software component as set out in any of the above aspects, and a computer system comprising such a display interface software component. Display interface software components as set out above may be used in any of the method aspects previously set out.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

OVERVIEW

In a conventional PC, dedicated display adapter hardware provides an interface to a display. The display adapter may be integrated into a motherboard or provided as an expansion card (e.g. PCI-Express). Display adapters commonly provide a basic VGA-compatible feature set, together with more advanced functionality, such as hardware-accelerated 3D rendering and media encoding/decoding. The connection from the display adapter to the display is via specialised output connectors and cables, such as those based on the VGA (HD15), DVI, HDMI, or DisplayPort standards.

Firmware and software components that run prior to operating system boot, (e.g. BIOS/UEFI boot code and OS loader software) may generate screen output by writing directly to a frame buffer of the display adapter, which may be memory-mapped into the processor's address space. Additionally, software interfaces may be available in the form of BIOS routines or UEFI GOP drivers to simplify output to the screen during the boot stage.

Once the operating system has been started, the operating system typically runs a display driver, which may be generic (based on display standards such as VGA) or may be hardware specific (e.g. NVIDIA Geforce or AMD Catalyst driver software). The display driver provides access to the display hardware, including advanced functionality such as 3D rendering where available. In some cases, the display driver may allow configuration of the hardware while the hardware, once configured, can continue to update the display without driver intervention.

Figure 1:
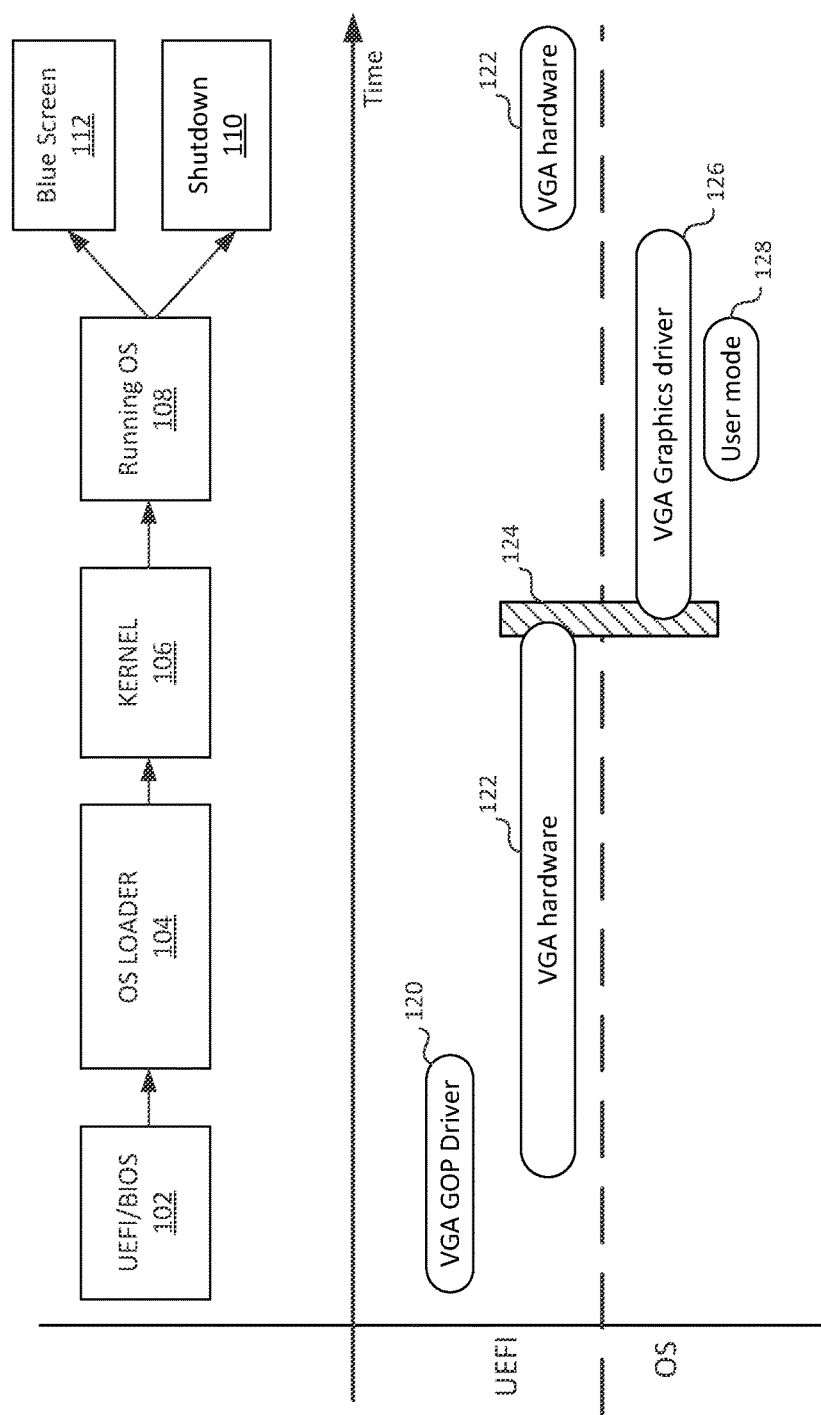
FIG. 1 illustrates operation of a conventional display interface.

FIG. 1 illustrates the operation of a typical VGA-compatible display architecture during different stages of a computer's operation.

The top half of FIG. 1 illustrates the main operational stages of the computer, starting (e.g. after power-on or reset) with running of the UEFI (Unified Extensible Firmware Interface)/BIOS (Basic Input/Output System) or other firmware boot code in stage 102. The firmware boot code locates and runs an OS loader program 104 (usually from an attached mass storage device, e.g. hard disk). The OS loader program is responsible for loading and starting up the operating system kernel 106. After initialisation of the system by the OS kernel, the operating system then enters normal operation (stage 108). Normal operation terminates either due to shutdown initiated by the user (stage 110), or due to an unrecoverable error, in which case system operation is suspended (stage 112) and an error message is displayed (commonly known in versions of the Microsoft Windows operating system as the "Blue Screen of Death", BSOD).

The lower half of FIG. 1 illustrates the operation of different components of the display architecture during the above operational stages (the elements are shown approximately time-aligned with the relevant operational stages in the upper half of the diagram).

During the various operational stages, the video hardware is configured and operated as follows:

1. Boot—UEFI/BIOS: UEFI Graphics Output Protocol (GOP) VGA Driver 120 initialises the video hardware 122. BIOS boot information and setup screens are displayed via the GOP interface. GOP establishes an in-memory framebuffer and the video hardware continues to rasterise this framebuffer to the display.

2. OS Loader—UEFI and GOP driver 120 are stopped and unloaded. The OS loader renders OS boot information and logo to the framebuffer. The video hardware 122 continues to rasterise the framebuffer to the display.
3. OS Boot—The OS Kernel 106 boots and renders OS boot option selection, logo and progress animation to the framebuffer. The video hardware 122 continues to rasterise the framebuffer to the display.
4. OS Graphics Stack—
   a. The OS initialises the kernel graphics stack including a display driver 126 for the system's video hardware. Further updates to the display are actioned via this driver interface and hence are mediated by the driver software (which may delegate the actual operation to the hardware).
   b. The OS initialises the user mode graphics composition stack 128. Further updates to the display are actioned via this composition stack and then the kernel mode driver 126 and hence are mediated by the driver software (which may delegate the actual operation to the hardware).
5. Shutdown—the OS Graphics stack is destroyed and the hardware 122 is configured to again render from the memory framebuffer. The OS renders the shutdown animation to the framebuffer.

The transition from OS Boot (stage 3) to the creation of the OS Graphics Stack (stage 4) also involves hardware initialisation 124, including enumeration and reset of the display adapter hardware.

Embodiments of the invention provide a system enabling display output to be transmitted from a computer to a display device without the need for special-purpose display adapter hardware and connections. Instead, the display signal can be carried over a general-purpose data connection. This may be a data bus used for attaching peripherals to a PC, such as USB or IEEE1394, a short-range wireless interface such as a Bluetooth, Infrared or Near-Field Communication (NFC) connection, or a connection used for remote communication, such as an Ethernet LAN or Wireless LAN.

A preferred embodiment will now be described in which the data transport connection is a Universal Serial Bus (USB), but it will be understood that, in principle, the invention may be adapted to any data transport mechanism or medium.

Figure 2:
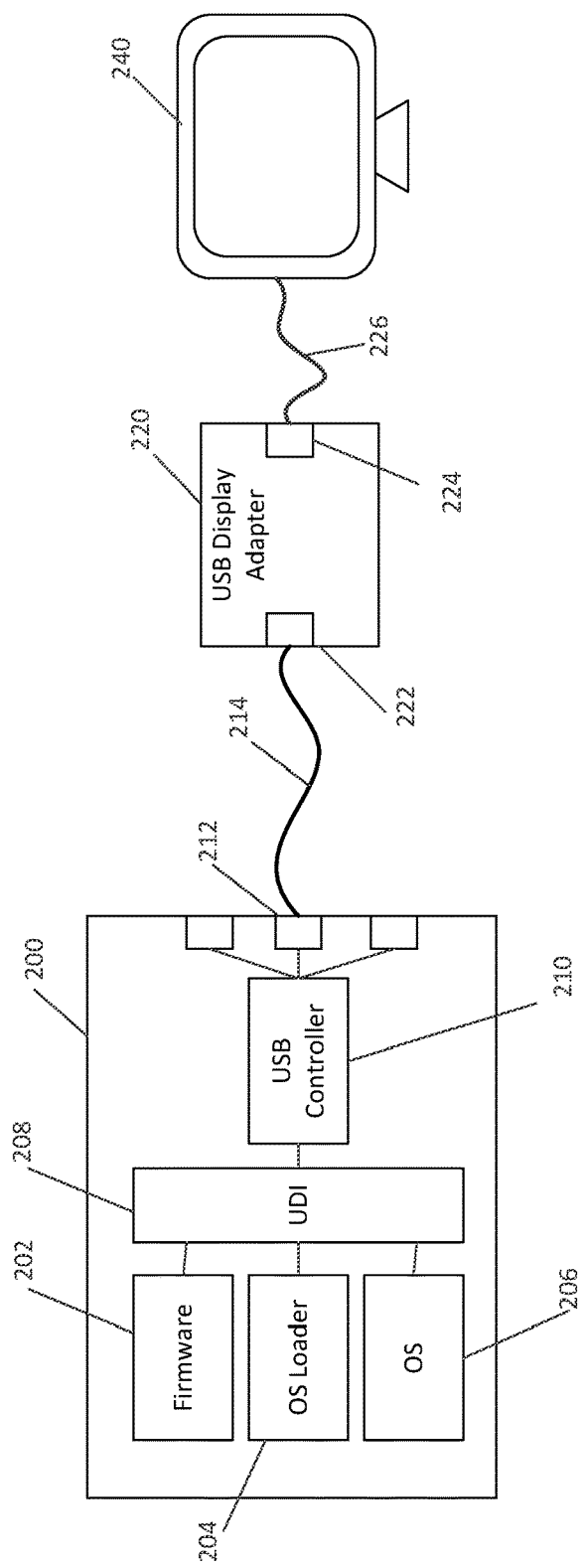
FIG. 2 illustrates in overview a display system for providing display output over a USB connection.

The system is illustrated in overview in FIG. 2, and includes a computing device 200, such as a desktop or laptop PC, which is connected to a display 240 via a USB display adapter 220.

The computer 200 comprises a conventional USB controller 210 and associated USB ports. One of the USB ports 212 connects to a USB port 222 in the USB display adapter 220, e.g. via a standard USB cable 214. The USB display adapter connects to the display 240 via a conventional display port 224 and display cable 226 (e.g. VGA, DVI or HDMI). Instead of connecting via cables, the USB Display adapter 220 may be in the form of a dongle that connects directly to either the computer or to the display (with a cable providing the other connection leg). Wireless display interfaces may also be used.

Display output is generated by software running on computer 200. The environment in which that software is running depends on the operational state of the computer. Prior to operating system (OS) boot, the software may be in the form of firmware 202 (e.g. BIOS or UEFI firmware). OS boot is managed by an OS loader 204. Normal operation (e.g. execution of user applications) is under the control of the OS 206. Display output may be generated from within each of these software contexts.

A software interface layer 208 provides for the capture of display data and its transport over the USB interface to the USB display adapter. This interface layer is referred to herein as the USB Display Interface, UDI. The UDI 208 preferably operates transparently by intercepting display output from the software 202/204/206, so that no modification of that software is required to enable use of the UDI.

The UDI includes a number of software components adapted to handle the different operational contexts, and also implements measures to ensure smooth transitioning between those contexts. In general terms, each UDI component performs the following functions:

Integrating into the display interface structure and driver configuration of a particular operational stage Initialisation of the USB display Collecting pixel data, encoding that data and transmitting it over USB.

Scaling image data to match output to available resolutions of the attached display As the computer transitions between operational stages, responsibility for image rendering and control of the USB display adapter 220 is transferred between the UDI components. During handover from one UDI component to the next, the USB display adapter 220 is configured to ensure persistence of the display contents from one stage to the next. The stage transitions can occur both forwards and backwards in the chain.

Each UDI component outputs display data over the USB connection (including the USB controller 210, USB port 212 and USB cable 214) to the USB display adapter 220. Access to the USB controller may be via a UEFI/BIOS USB interface or an operating system driver depending on the current operating stage.

The USB display adapter 220 receives and buffers the display data, performs any necessary format conversion and outputs a display signal to the display 240 over the conventional display connection comprising connector 224 and cable 226 (e.g. a VGA, DVI or HDMI link).

The display adapter includes a processor, a video decoder and a video output controller. The processor handles actions such as mode queries, mode setting, blanking and the like, while the video decoder handles the compressed video stream received from the computer. The video decoder decompresses the video into a memory framebuffer that is rasterised out to the display by the video output controller. The framebuffer serves to decouple the update rate of the compressed data stream received from the computer (which is variable depending on content) from the display raster rate (which is typically fixed e.g. at 60 Hz).

The following sections describe the operation of the UDI components in more detail. Though largely described in the context of versions of the Microsoft Windows operating system and associated display driver architectures (especially versions of Windows using the Windows Driver Foundation, e.g. Windows 2000 and later), it will be understood that the same basic principles can be adapted for use in other operating system environments and driver architectures).

Operation of the USB Display Interface

The USB Display Interface (UDI) 208 provides a chain of software components to allow operation of the system without dedicated video hardware and without dedicated video connectors. The UDI cannot rely on any hardware to perform the rasterisation of the in-memory framebuffer and so this functionality is implemented in software (running on the system CPU). Preferably, this functionality is implemented within each runtime context (UEFI, OS loader, OS) to ensure maximum coverage. Furthermore, the software display functionality is preferably available from the earliest possible time to the latest possible time within each operational stage, so as to minimise any time periods (at the handover point between stages) where a display output cannot be transmitted to the USB-connected display 240.

The operation of the UDI in each runtime context is similar with a capture, compress and transport pipeline for obtaining and processing display data and outputting it over the USB connection. However the capture mechanism depends on the integration with the runtime context. In one approach, a UDI component can implement a standard graphics API available within a particular runtime context, and so can receive graphics data via that API and push the data through the USB output pipeline on demand. In another approach display data is periodically read from a hardware-implemented or software-emulated framebuffer.

Figure 3:
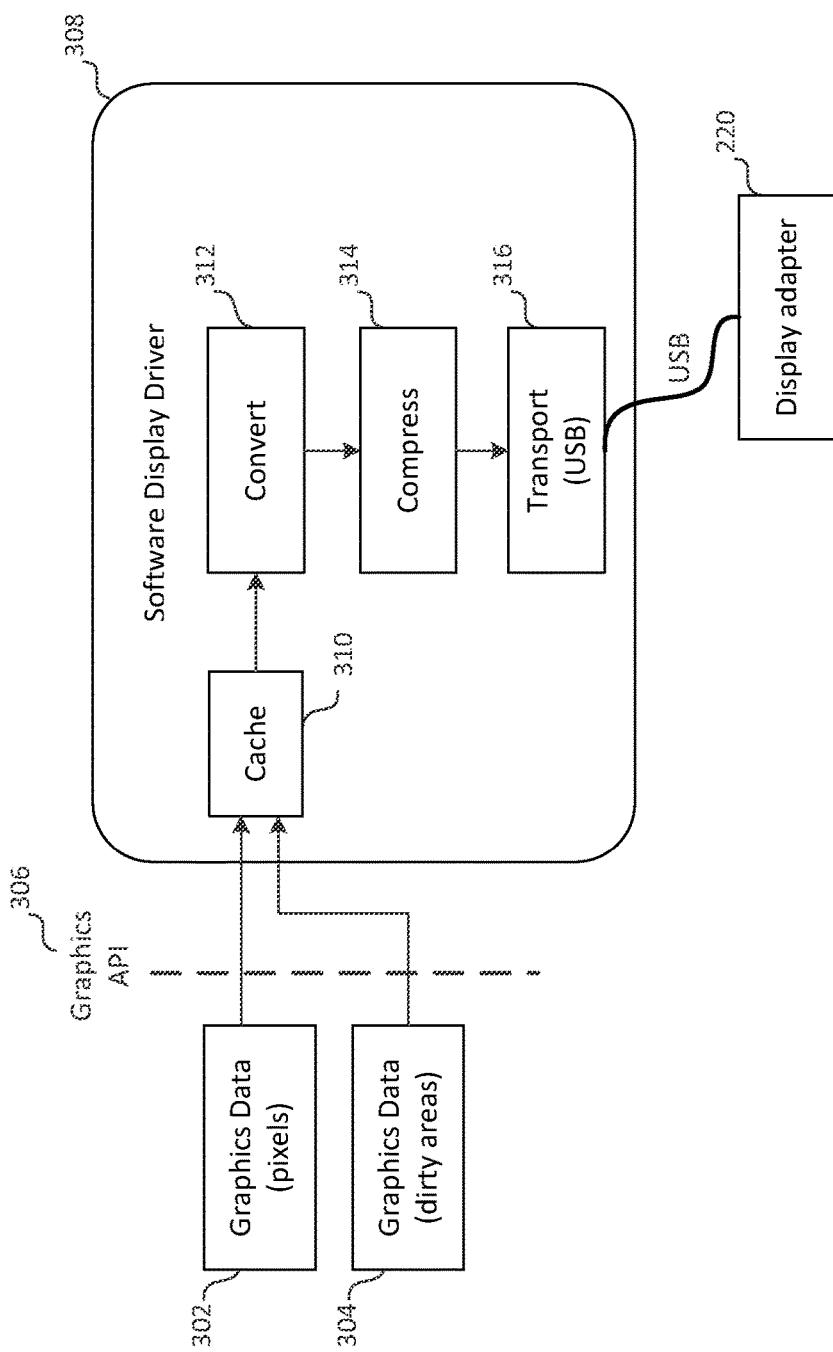
FIG. 3 illustrates transport of display output over USB using a graphics API coupled to a software display driver.

A UDI component implementing a standard graphics API is illustrated in FIG. 3. In this approach, a software display driver 308 takes the place of a conventional display driver and associated display hardware. Graphics data, e.g. in the form of pixel data 302 and associated metadata 304 is received by the driver 308 via a standard graphics API 306 and stored in a cache 310.

Metadata 304 may include dirty area information, providing information about what areas on the screen have changed since the last update. Such information can be useful for compression. Other forms of metadata may include the resolution and format of the pixel data, the refresh rate and rotation of the screen, and the like.

The cache 310 supplies pixel data and metadata to a pipeline comprising a conversion component 312, a compression component 314 and a USB transport component 316.

The conversion component 312 converts the graphics data into a format suitable for transport over USB. The compression component 314 compresses the data using any appropriate compression algorithms in order to reduce the data volume to be transported.

The conversion and compression components may operate to encode only those parts of the display that have changed since the last transmission of a frame to the display (for example only the parts affected by the Graphics API call currently being handled). Those parts are identified based on dirty area information forming part of the graphics metadata 304. The output of the compression component then only includes compressed data for the changed areas of the frame, together with metadata identifying those areas.

The compression component outputs compressed information (optionally including metadata) for a single display frame to the USB transport component 316, which packetizes the compressed data into transfer units of a size and format appropriate to the bus and display adapter, and outputs the packetized data to the display adapter 220 over the USB link. This involves interfacing with a standard USB interface (e.g. a UEFI USB interface or a USB driver provided by the OS).

The compressed data is received by the display adapter 220 and decompressed. The display adapter may maintain a cached copy of the last received/displayed frame, which it may use to reconstruct the new frame if the received frame only includes the changed regions, by combining the changed regions from the received data with the cached data for the other areas of the frame. Alternatively, the transmitted data may comprise a complete frame. The decompressed and optionally reconstructed frame is then output to the display (as indicated above, the display adapter uses its own framebuffer to decouple display refresh from the receipt of frames, which typically occur at different frequencies).

The software display driver 308 may, for example, take the form of a GOP driver during the UEFI boot stage, and an OS display driver during normal OS operation.

Figure 4:
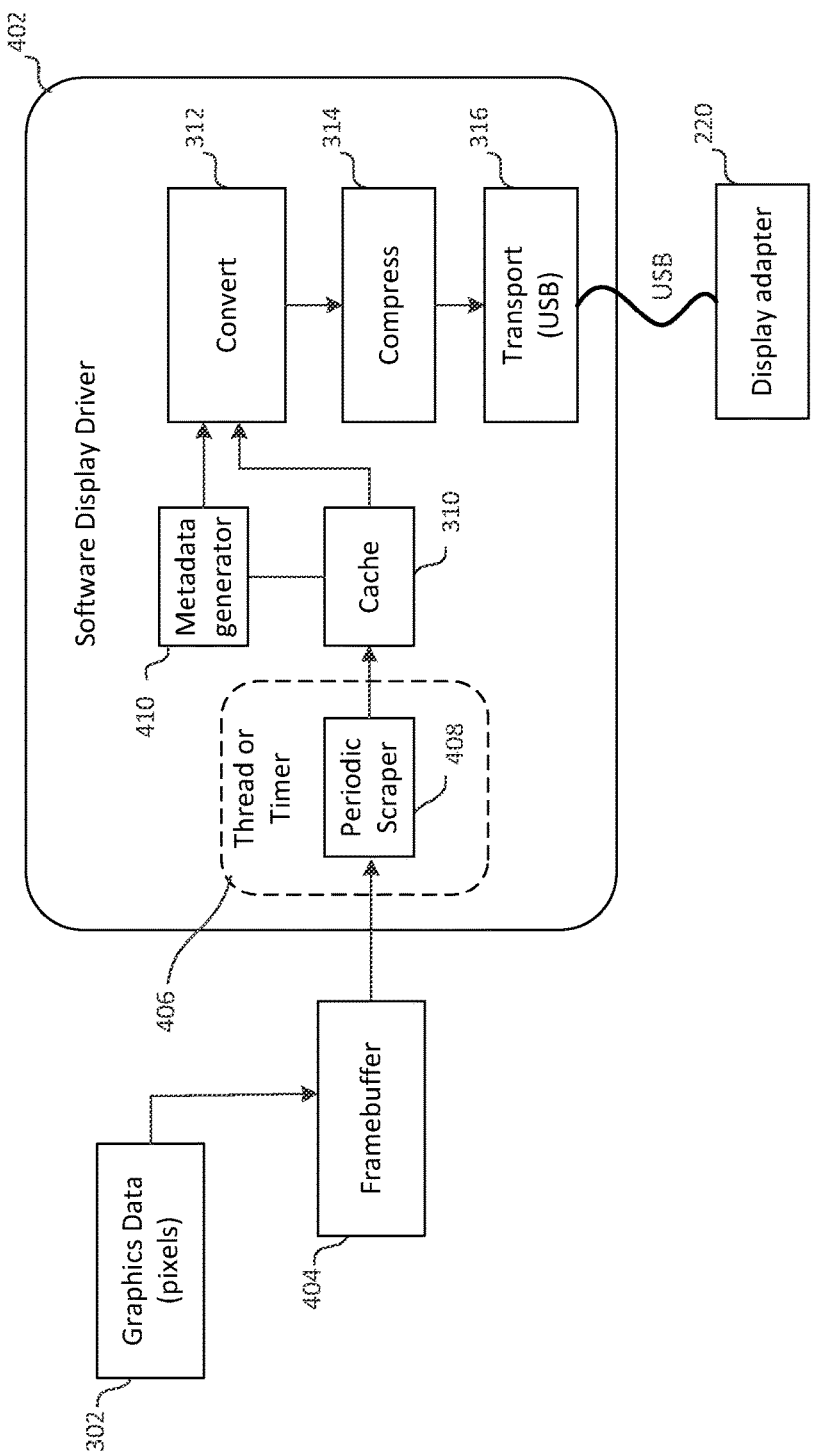
FIG. 4 illustrates a software display driver providing display output over USB using a framebuffer scraper.

In runtime contexts where there is no standard graphics API, the UDI emulates the video hardware's in-memory framebuffer rasterisation. This approach is illustrated in FIG. 4.

In this approach the graphics data (i.e. pixel data 302) is written into a framebuffer 404 in memory. The software display driver 402 comprises a scraper operation 408 which is run periodically. This may be as part of a separate scraper thread 406 in the driver, or may be triggered by a timer. The scraper preferably operates at a frequency of at least 5 Hz. In a preferred embodiment, the frequency is around 10 Hz, though higher frequencies may advantageously be used, even as high as the native refresh rate of the display, e.g. around 60 Hz for a 60 Hz display.

The scraper 408 implements the emulation of the framebuffer by periodically scanning the framebuffer and forwarding the pixel data via cache 310 to the display pipeline (consisting of the conversion, compression and transport operations 312, 314, 316 as described previously in relation to FIG. 3).

The driver may optionally include a metadata generator 410 which compares the framebuffer contents to a cached history of the display to reconstruct the dirty-area information. In this approach, the driver 402 maintains a copy of the last display frame sent to the display in cache 310. The metadata generator 410 compares this to the current frame read from the framebuffer, and compiles a list of screen regions that have changed (the "dirty areas"). This metadata is then used in the convert-compress-transport pipeline as described above to reduce the amount of data that has to be encoded and transmitted.

The API and scraper approaches (as illustrated in FIGS. 3 and 4 respectively) may be used at different operational stages (in different runtime contexts) and where necessary may be combined. Thus, a software display driver may implement either or both of the approaches described in relation to FIGS. 3 and 4.

Figure 5:
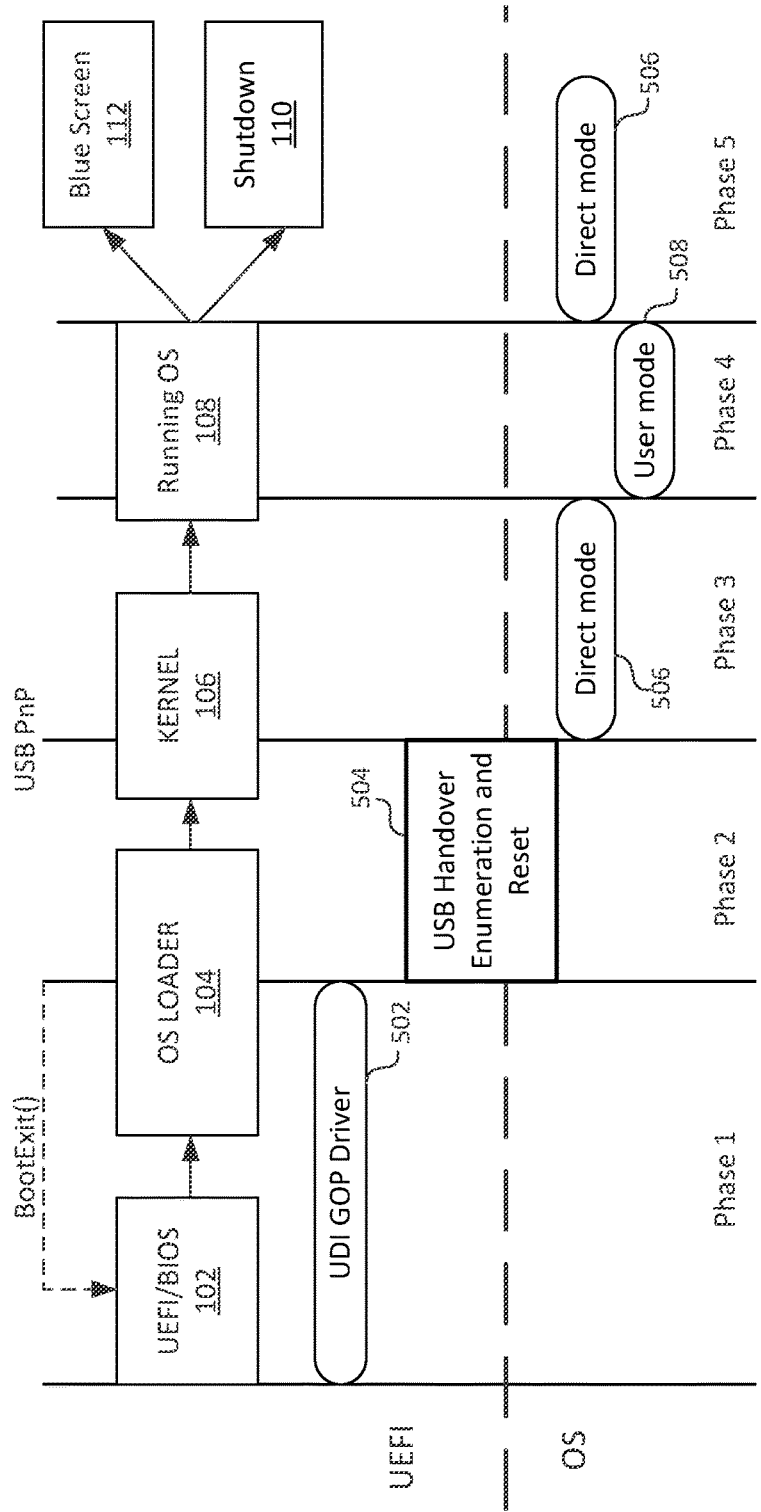
FIG. 5 illustrates operation of a USB Display Interface during different stages of operation of a computer.

FIG. 5 shows the operation of the UDI components during the different operational stages. The operational stages depicted correspond to those shown in FIG. 1, i.e. UEFI/BIOS boot stage 102, followed by the OS loader 104 loading the kernel 106, leading to normal OS operation in stage 108 and finally regular shutdown 110 or termination 112 due to a fault.

The UDI operates either as a graphics API driver or framebuffer scraper depending on the operational stage. In some cases, such as the GOP driver, the interface may act as both simultaneously. FIG. 5 has been subdivided into a number of phases to show the transitions between different operating modes of the UDI.

In particular, a new UDI GOP driver 502 replaces (or may be provided in addition to) the VGA GOP driver 120 of FIG. 1. This GOP driver operates during the initial stages of boot (the UEFI/BIOS operation and the early part of the operation of the OS loader) and captures content via both API and scraping approaches (see FIGS. 3 and 4). This combined approach accommodates legacy applications that render directly to the framebuffer (such as the OS loader) instead of using the GOP interface.

During loading of the OS and initialisation by the OS kernel, control of the USB hardware passes from the UEFI/BIOS to the operating system. This involves a reset of the USB hardware and enumeration of USB devices as per standard OS USB initialisation procedures 504 (phase 2). Once the operating system's USB driver stack is operational, the system loads a direct mode display driver 506. Subsequently, after user login, a user mode display driver 508 is started. The direct mode (kernel mode) display driver and user mode display driver operate as per FIG. 3, by processing OS display API calls and passing the received display data and metadata on to a convert/compress/transport pipeline for transmission over USB. The direct mode and user mode drivers consist of several individual driver components as described in more detail below.

Figure 6:
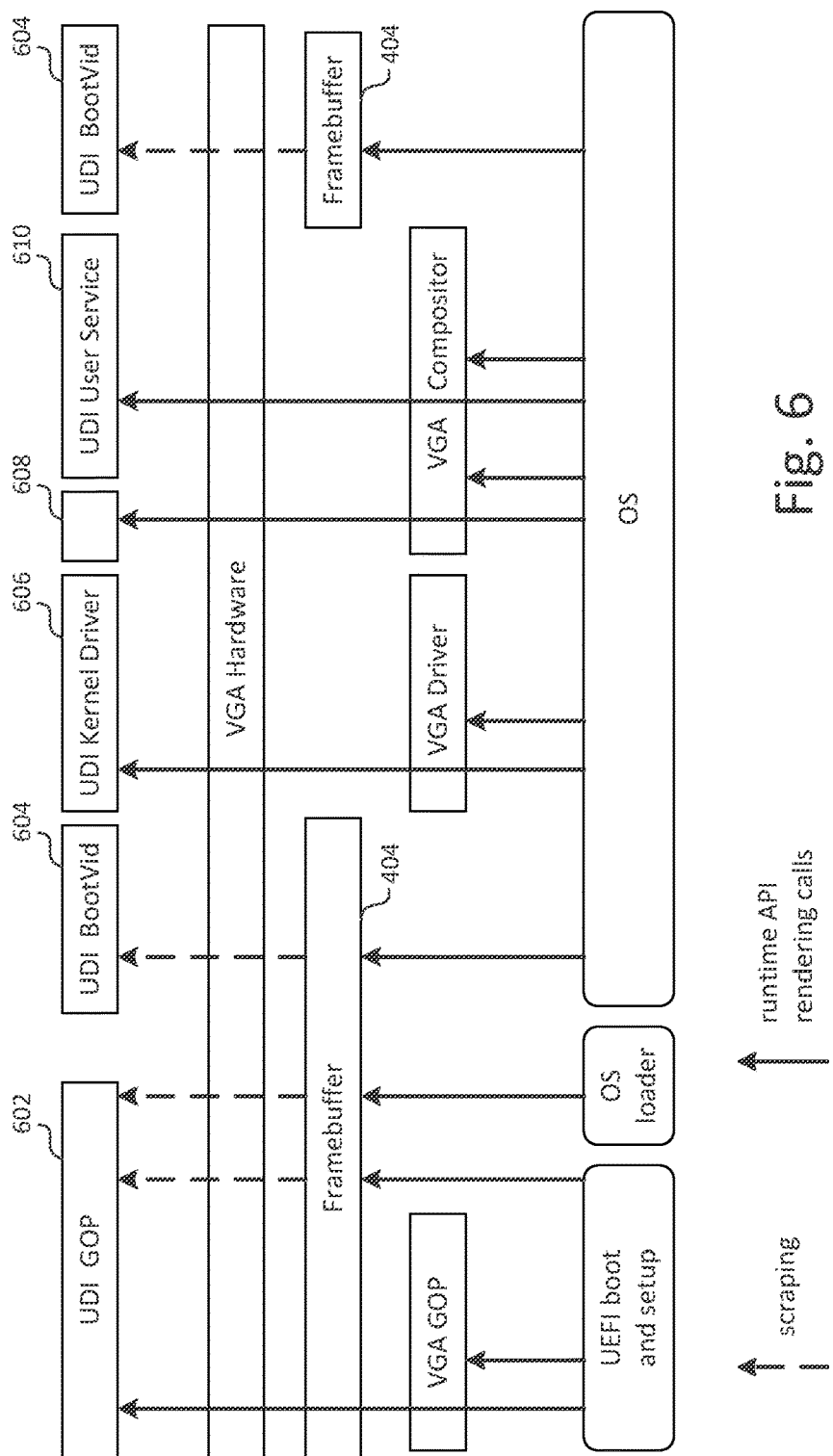
FIG. 6 illustrates operation of the USB Display Interface in more detail.

FIG. 6 shows the individual UDI components of the USB display interface in more detail, in relation to a timeline of system operation, and illustrates where the display content is made available either via a graphics API or via scraping of an in-memory framebuffer at various points in time. FIG. 6 also illustrates by way of comparison how information flows to conventional VGA display components during the same stages of operation (such conventional VGA display components may or may not be present at the same time as the UDI as discussed in more detail below).

In the diagram, solid arrows show image data passed by graphics API calls, and dashed arrows show image data obtained by scraping the frame buffer.

The UDI components include:
A UDI GOP Driver 602, which operates both through GOP-compatible API calls during the UEFI boot and setup stages (i.e. the firmware stage), and via framebuffer scraping during that stage and during the running of the OS loader
UDI BootVid Driver 604, which operates during an early stage of OS initialisation, and during OS shutdown, and operates via framebuffer scraping
UDI Kernel Driver 606, which operates during the OS Kernel Rendering Stage via display driver APIs
UDI Compositor 608, which operates during the OS Compositing Stage via display driver APIs
UDI User Service 610, which operates during ordinary OS operation, after user login, via display driver APIs
Fault condition handling, which handles display of an error screen during an OS Fault Condition (e.g. BSOD)

The above represents a functional division of UDI functionality. In practice, each functional unit may be implemented by a separate software component, or alternatively several functional units may be combined into a single software component.

The UDI may be included in (or installed during) a standard OS installation. Alternatively an existing computer (with installed OS) may be configured to use the UDI by installing the relevant UDI components/drivers (e.g. in the UEFI and the OS), and performing other configuration steps (e.g. to specify driver load order) as described elsewhere herein.

The operation of the different UDI components during each of the operational stages will be described in more detail in the following sections.

Firmware Stage

The Firmware Stage is the initial state of the system from power on. Typically the firmware implements a UEFI or BIOS compatible system interface and boot code. During this stage, the system performs various checks and initialisations. The user can manipulate various settings via the BIOS settings utility and can select the boot device. The firmware then runs the OS loader which can use the firmware facilities until it transfers control to the operating system (referred to as the Boot Exit point).

The UDI provides a standard Graphics Output Protocol (GOP) interface to the UEFI to receive pixel data which is subsequently encoded and sent over USB via the UEFI USB interface as described above. BIOS displays for configuration and boot device selection are presented via this GOP interface.

Concurrently, the driver periodically scrapes pixel data from the VGA hardware video device by accessing its framebuffer memory. This is necessary to capture pixels from non-conformant or legacy programs that draw directly to the framebuffer, bypassing the GOP interface and relying on the VGA hardware rasteriser to render the pixels to the display. Some OS loaders display in this way.

In a system without VGA hardware, the UDI emulates the functionality by providing its own framebuffer in memory. UEFI and OS processes query the framebuffer memory location via the GOP API, and so the UDI GOP driver is configured to respond to these queries by providing the address of the emulated framebuffer instead of a VGA hardware framebuffer.

At Boot Exit point, the UEFI GOP features are stopped and the UDI GOP Driver is unloaded. At this point the UDI receives no pixels directly nor is it able to scrape image data from the frame buffer, so that the display is not updated during this time (Phase 2 in FIG. 5).

However, the OS loader display is typically static at this point and it therefore suffices to simply maintain the current contents of the display. To achieve this, the UDI GOP driver instructs the USB display adapter to maintain the display on and with static content corresponding to the last received display data during the next USB reset that will occur as the OS starts up. This improves continuity of the display and makes for a smoother user experience.

The system does not return to this stage until system reset.
OS Boot Video Stage The OS Boot Video Stage covers the early period from OS load to OS initialisation of the graphics stack. Typically at this stage the OS will display some sort of progress animation as it initialises the system.

During this phase, many operating systems use a simple VGA-compatible display driver (known in Windows systems as the BootVid driver).

The UDI includes a boot video driver component which augments the OS BootVid driver (UDI BootVid driver 604 in FIG. 6). This acts as a periodic framebuffer scraper in a similar manner to the GOP firmware driver. When ready, it queries the memory location and size of the boot framebuffer and then processes the pixel data (written to the framebuffer by the OS Bootvid driver) at regular intervals, encodes it and forwards it to the USB display adapter (as described with regard to FIG. 4).

The BootVid driver cannot start immediately at OS load but must wait for the OS to initialise the USB stack, which is needed to enable transport of the display data over USB. To minimise the gap between Firmware and Boot Video stages, the OS is configured to prioritise the loading of USB host controller and USB hub drivers at the first round of device enumeration. For example, in an operating system like Windows, which loads drivers by group, this involves moving the USB drivers (USB host controller and USB hub drivers) into the "Boot" group, i.e. the first group of drivers that are loaded. The UDI BootVid driver is also preferably added to this group. Additionally, it is possible to mask or modify the enumeration of PCI devices to promote the enumeration of USB host controllers ahead of other devices.

This stage continues to scrape from the boot framebuffer until the OS constructs the graphics stack including initialisation of the video hardware low-level (2D) drivers. At this point control of the USB display is passed to the Kernel Rendering stage.

Control is handed back to this stage during OS shutdown as the graphics stack is torn down.

OS Kernel Rendering Stage

The OS Kernel Rendering Stage covers the period from the OS initialisation of the OS graphics stack to the OS initialisation of the OS user mode compositor.

The UDI Kernel Rendering Driver 606 (FIG. 6) acts as an OS graphics driver (or intercepts calls to the OS graphics driver if a hardware video driver is also present) with 2D display support. As such, all graphics data is passed directly to the driver in the form of pixel data and associated metadata (such as dirty area rectangles).

This simple 2D interface is also used to display OS fault conditions should the OS enter into an unrecoverable error state. Handling of fault conditions is described in further detail below.

This stage continues until the driver detects the presence of the UDI user mode compositor 608 or the UDI user mode service 610. Control reverts to this stage if both the compositor 608 and service 610 have stopped.

However, the UDI kernel mode driver preferably continues to handle display configuration even during subsequent stages where display rendering (i.e. output of display data) is handled by the user mode service, as described further below.

OS Compositing Stage

The OS Compositing Stage covers the period from OS user mode initialisation to shutdown. In this stage, the OS provides a user mode compositor component which composites the system display using 3D primitives (e.g. compositing multiple windows into a complete desktop screen). Immediately after starting the OS compositor, general user mode services are not yet running. It is typically a very brief period at about the time of the login screen.

The UDI Compositor Renderer 608 operates within the OS compositor as a user mode graphics driver. It is loaded into the process by the UDI Kernel Driver 606 and monitors 3D primitive operations via the user mode graphics driver API. When the renderer 608 detects an update to the display, it connects to the UDI Kernel Driver 606, passing the pixel data and metadata (e.g. dirty areas) through. The UDI Kernel Driver 606 performs the compression and transmission of this content (as per the process described in relation to FIG. 3).

This stage continues until it detects the presence of the UDI User Service 610 at which point it passes the pixel data and metadata (dirty areas) to that component rather than the UDI Kernel Driver 606.

OS User Service Stage

The OS User Service Stage covers the normal OS operation.

In this stage the UDI User Mode Service 610 (a background application running in user mode) interfaces with the UDI compositor renderer 608 running within the OS compositor (see above) to collect display data (pixel data and metadata) and performs the compression and transmission to the device via USB (and USB drivers) using the methods described in relation to FIG. 3. However, as it is running in user mode, this software implementation is easier to develop and can be more complex. For example, in preferred embodiments, the user service may implement higher performance compression modes and more features such as improved desktop layout, protected content, power saving, etc.

The UDI User Mode Service 610 also interacts with the Kernel Mode driver 606 to handle setup of display modes and display configuration.

This is the final stage in the boot sequence, and so there is no handover from this stage. However, control reverts to the UDI Compositor Renderer 608 or UDI Kernel Driver 606 on exit from the User Service.

OS Fault Condition

Rendering of the OS Fault Condition (e.g. Windows "Blue Screen of Death") is a special condition as the display must be presented while the OS runtime is halted. In a typical system, the fault information is rendered to the display via the in-memory framebuffer which is in turn delivered to the screen by the dedicated video hardware.

With the UDI, framebuffer rendering by the video hardware is not available. Furthermore, access to the USB is limited because the OS is in the process of halting. Typically it is only possible to issue a single USB packet (512 bytes) in this time, before the USB service becomes unavailable. A single packet is generally not sufficient to send the contents of a complete fault screen.

To work around this, the UDI Kernel Driver 606 sends pixel data for a complete fault screen to the USB display adapter 220 (FIG. 2) at startup, while the system is still healthy. The adapter does not display this content but instead stores it in an offscreen memory area. When the system enters a fault condition, the UDI Kernel Driver 606 then sends a single packet to the USB adapter instructing it to show the pre-stored fault screen.

The fault condition is detected by way of a hook in the graphics driver where it presents the full fault screen (which would normally be placed into the framebuffer by the hardware graphics driver). However, because the fault screen contents were pre-generated and sent to the display adapter in advance of any fault, full details of the fault are not provided (e.g. to specify the driver at fault or provide crashdump information); instead a default, simplified fault message is displayed.

UDI Driver Stack

Figure 7:
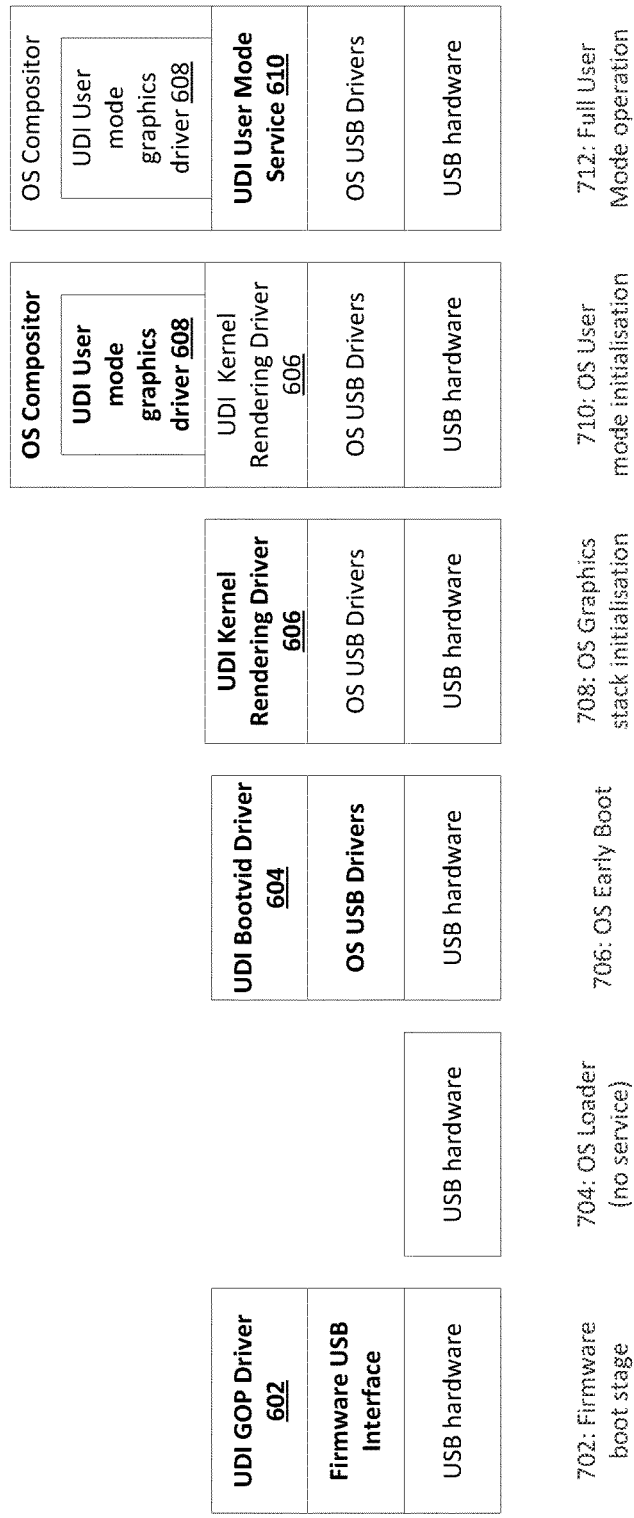
FIG. 7 illustrates the configuration of the USB Display Interface stack during different stages of operation of the computer.

FIG. 7 summarises key elements of the UDI driver stack at different operational stages. FIG. 7 shows the stack as it applies to the flow of pixel data (rather than display configuration, which may follow a different data flow, as indicated above).

During the firmware boot stage 702, the UDI GOP Driver 602 receives display data via GOP calls and framebuffer scraping and transmits it via the firmware USB interface to the USB hardware for transmission to the display adapter and display.

During part of the OS loader stage 704, no UDI service is available due to handover of USB control from the firmware to the operating system. However, the display adapter has been configured to maintain a static display output during this time as described above.

During the OS early boot stage 706, the UDI BootVid driver 604 obtains display data by scraping the framebuffer (written to by the OS BootVid driver) and outputs to the USB hardware via the operating system USB Drivers.

During OS Graphics stack initialisation stage 708, the UDI Kernel Rendering Driver 606 is loaded. It receives display data via the OS display APIs, and outputs it via the OS USB driver stack as before.

At User mode initialisation stage 710, the UDI User mode graphics driver 608 is loaded and interfaces with the OS compositor. Display data is received from the OS compositor/UDI User mode graphics driver and passed to the UDI Kernel Rendering Driver 606, which processes it as in the earlier stage.

Finally, the UDI User Mode Service 610 runs during full user mode operation stage 712, replacing the UDI Kernel Rendering Driver 606 in the pixel data path. The UDI User Mode Service 610 now receives the display data from the UDI User mode graphics driver 608 in the OS compositor and outputs it to the OS USB driver stack using its own implementation of the conversion/compression/USB transport pipeline of FIG. 3.

Thus, the UDI GOP Driver 602, UDI Bootvid driver 604, UDI Kernel Rendering Driver 606 and UDI User Mode Service 610 may each provide their own version of the conversion/compression/USB transport pipeline, potentially with different features and functionality. Alternatively, some or all of these components could share a single implementation of the pipeline (e.g. implemented as a separate component in the stack).

Dual Operation

The system described above can be used in a computing device without dedicated video hardware (i.e. without hardware display adapters and connectors). For example, the system could be implemented in a small form-factor PC with a set of USB ports as the only means for connecting peripherals, including the display, keyboard and mouse. This allows a fully functioning PC to be provided with reduced hardware complexity and cost. The UDI software described allows output to be passed to a USB-connected display during substantially all stages of operation of the computer device, and thus allows a USB-connected display to be used as the primary display for the computer. Furthermore, the UDI system can support multiple USB-connected displays, for example in a tiled or mirrored multi-monitor setup.

However, where a hardware display adapter is available (but not connected to a display), this may be utilised by the UDI, in particular by using the display framebuffer provided by the hardware adapter (where this is not available the framebuffer is emulated as previously described).

Furthermore, in an alternative arrangement, the UDI can be used in addition to conventional display hardware and driver stacks, to allow simultaneous use of USB-connected displays and other displays connected via conventional means (for example in a mirrored or tiled multi-monitor setup). In such a case graphics data flow may be provided during various operational stages to the conventional display driver and hardware components at the same time as to the UDI components, as depicted in FIG. 6.

Thus, the UDI system preferably supports the following modes:

VGA hardware with connected display(s), and UDI software with USB-connected display(s)
VGA hardware (no connected display) together with UDI software with USB-connected display(s)
UDI software with USB-connected display(s) only Operation During Non-Standard Operational Stages The above approaches may also be used to provide display output during operation system installation/setup. For example, a frame buffer scraping driver may be used during an early stage of the installation procedure (similarly to the Bootvid driver described above), followed by a kernel mode driver during a subsequent stage, once the OS kernel has been installed and started. An operating system such as Windows will typically restart during installation (possibly multiple times); by configuring the operating system to use the relevant kernel and user mode drivers as described previously, those drivers can then be used as normal during the later parts of the OS installation.

Similarly, the described principles can be applied to other non-regular operational stages, such as boot selection interfaces, by providing at each stage a display driver component that interfaces with the relevant display API and other services available at the particular stage (e.g. firmware APIs and services, or operating system APIs and services) and/or reads from a framebuffer, and outputs display data received through API calls or from the framebuffer to the display adapter via the USB.

It will be understood that the present invention has been described above purely by way of example, and modification of detail can be made within the scope of the invention.

For example, although a system is described above in which a display output is transmitted over USB, the described approach is applicable to any software driven display device that might be connected by any generic bearer such as other wired or wireless peripheral connection standards, as well as wired or wireless local or wide area networks, or mobile data networks. In such systems, the USB-specific components described above (e.g. hardware USB controller and interconnects and USB driver stack) may be replaced with appropriate hardware and software (driver) components specific to the particular data transport used.

Instead of separate UDI driver components, alternative implementations might comprise a single software component that works through all stages of computer operation. This might be a UEFI driver that persists after boot-exit or a software-emulated video device that emulates real video hardware through a virtualisation scheme.

The implementation of the UDI driver components may depend on the firmware type and operating system environment used. For example, though a UEFI GOP interface is described above, the firmware UDI component could instead implement an Extensible Firmware Interface (EFI) Universal Graphic Adapter (UGA) interface protocol, or a standard set of BIOS display functions (e.g. in the form of the standard BIOS INT10h interrupt function calls and associated extensions). Similarly, OS-level UDI components may be structured and configured to interface with the display driver architecture of other operating systems, such as versions of Linux or Mac OS.

The invention claimed is:

1. A method of enabling a computer to provide output to a display over a Universal Serial Bus (USB) general-purpose data transmission medium, the method comprising:
providing a plurality of display interface components, each display interface component adapted to receive display data and transmit the display data via the general-purpose data transmission medium for output to the display, each display interface component associated with a different respective stage of operation of the computer, wherein at least a first display interface component comprises a pre-Operating System (OS) display interface component, and at least a second display interface component comprises an OS display interface component configured to interface with the OS of the computer; and
configuring the computer to use a respective one of the display interface components during each of a plurality of distinct operational stages of the computer, wherein the first display interface component is used at a pre-OS stage of operation prior to booting of an OS and the second display interface component is used at a stage of operation when the OS of the computer has been booted, wherein operation of the computer is under control of firmware during the pre-OS stage, the method comprising configuring the firmware to use the pre-OS display interface component for outputting display data, wherein the plurality of display interface components comprises one or both of:

a kernel mode display driver, configured to receive display data prior to initialisation of a user mode of the operating system and output the display data to the general-purpose data transmission medium; and a user mode display service, configured to receive display data and output the display data to the general-purpose data transmission medium after initialisation of the user mode, the method further comprising receiving display data from the operating system at a user mode display driver after initialisation of the user mode and outputting the display data to the general-purpose data transmission medium using a selected one of the kernel mode display driver and the user mode display service in dependence on a current operational state of the operating system.

2. A method according to claim 1, wherein the pre-OS display interface component is adapted to receive display data output by pre-OS code running on the computer, the pre-OS code including one or both of: firmware code; and OS loader code.

3. A method according to claim 1, wherein the pre-OS display interface component is adapted to receive display data through calls to a firmware display interface/API and/or is adapted to implement a firmware display protocol.

4. A method according to claim 1, wherein the pre-OS display interface component is adapted to read display data from a framebuffer and output the display data to the general-purpose data transmission medium.

5. A method according to claim 1, comprising configuring the computer to load a third display interface component during a first boot stage of booting the OS prior to establishment of an operating system display driver stack, and to load a fourth display interface component during a second boot stage of booting the OS, as part of establishing the operating system display driver stack, wherein the third display interface component is configured to read display data from a framebuffer written to by the OS and output the read display data to the USB general-purpose data transmission medium and the fourth display interface component is configured to receive display data through calls to an operating system display API.

6. A method according to claim 1, wherein the user mode display driver is configured to output the display data to the kernel mode display driver prior to starting of the user mode display service, and to the user mode display service after starting of the user mode display service.

7. A method according to claim 1, comprising configuring the operating system to prioritise during booting of the operating system one or both of:

loading of a selected one of the display interface components; and loading of one or more drivers associated with the general-purpose data transmission medium.

8. A method according to claim 7, comprising configuring the OS to place the display interface component and/or the data transmission medium driver(s) in a first group of drivers processed by the operating system when loading drivers during boot.

9. A method of enabling a computer to provide output to a display over a Universal Serial Bus (USB) general-purpose data transmission medium, the method comprising:

providing a plurality of display interface components, each display interface component adapted to receive display data and transmit the display data via the general-purpose data transmission medium for output to the display, each display interface component associated with a different respective stage of operation of the computer, wherein at least a first display interface component comprises a pre-Operating System (OS) display interface component, and at least a second display interface component comprises an OS display interface component configured to interface with the OS of the computer; and configuring the computer to use a respective one of the display interface components during each of a plurality of distinct operational stages of the computer, wherein the first display interface component is used at a pre-OS stage of operation prior to booting of an OS and the second display interface component is used at a stage of operation when the OS of the computer has been booted, wherein operation of the computer is under control of firmware during the pre-OS stage, the method comprising configuring the firmware to use the pre-OS display interface component for outputting display data, wherein the display interface components are configured to output display data to a display adapter connected to the USB general-purpose data transmission medium, the display adapter configured to output a display signal to the display based on received display data.

10. A method according to claim 9, comprising configuring the display adapter to maintain an output image on the display during transition from one display interface component operating during one operational stage to a different display interface component operating during a different operational stage, wherein the output image is preferably a static image during the transition and/or is an output image previously transmitted to the display adapter.

11. A non-transitory medium storing computer-executable program code, the program code executable by a computer to:

provide a plurality of display interface components, each display interface component adapted to receive display data and transmit the display data via the general-purpose data transmission medium for output to the display, each display interface component associated with a different respective stage of operation of the computer, wherein at least a first display interface component comprises a pre-Operating System (OS) display interface component, and at least a second display interface component comprises an OS display interface component configured to interface with the OS of the computer;

configure the computer to use a respective one of the display interface components during each of a plurality of distinct operational stages of the computer, wherein the first display interface component is used at a pre-OS stage of operation prior to booting of an OS and the second display interface component is used at a stage of operation when the OS of the computer has been booted; and configure the firmware to use the pre-OS display interface component for outputting display data,
wherein operation of the computer is under control of firmware during the pre-OS stage,
wherein the plurality of display interface components comprises one or both of:
a kernel mode display driver, configured to receive display data prior to initialisation of a user mode of the operating system and output the display data to the general-purpose data transmission medium; and
a user mode display service, configured to receive display data and output the display data to the general-purpose data transmission medium after initialisation of the user mode,
the program code further executable by the computer to receive display data from the operating system at a user mode display driver after initialisation of the user mode and output the display data to the general-purpose data transmission medium using a selected one of the kernel mode display driver and the user mode display service in dependence on a current operational state of the operating system.

12. A computer comprising
a plurality of display interface components, each display interface component adapted to receive display data and transmit the display data via the general-purpose data transmission medium for output to the display, each display interface component associated with a different respective stage of operation of the computer, wherein at least a first display interface component comprises a pre-Operating System (OS) display interface component, and at least a second display interface component comprises an OS display interface component configured to interface with the OS of the computer; and
wherein the computer is configured to use a respective one of the display interface components during each of a plurality of distinct operational stages of the computer, wherein the first display interface component is used at a pre-OS stage of operation prior to booting of an OS and the second display interface component is used at a stage of operation when the OS of the computer has been booted, wherein operation of the computer is under control of firmware during the pre-OS stage, the firmware being configured to use the pre-OS display interface component for outputting display data,
wherein the display interface components further comprise one or both of:
a kernel mode display driver, configured to receive display data prior to initialisation of a user mode of the operating system and output the display data to the general-purpose data transmission medium; and
a user mode display service, configured to receive display data and output the display data to the general-purpose data transmission medium after initialisation of the user mode,
the computer further comprising a user mode display driver configured to receive display data from the operating system after initialisation of the user mode and to output the display data to the general-purpose data transmission medium using a selected one of the kernel mode display driver and the user mode display service in dependence on a current operational state of the operating system.

13. A computer according to claim 12, wherein the pre-OS display interface component is adapted to receive display data output by pre-OS code running on the computer, the pre-OS code preferably including one or both of: firmware code; and OS loader code.

14. A computer according to claim 12, wherein the pre-OS display interface component is adapted to receive display data through calls to a firmware display interface/API and/or is adapted to implement a firmware display protocol.

15. A computer according to claim 12, wherein the pre-OS display interface component is arranged to read display data from a framebuffer and output the display data to the general-purpose data transmission medium.

16. A computer according to claim 12, comprising a third display interface component configured to be used during a first boot stage of booting the OS prior to establishment of an operating system display driver stack, and a fourth display interface component configured to be used during a second boot stage of booting the OS, as part of establishing the operating system display driver stack, wherein the third display interface component is configured to read display data from a framebuffer written to by the OS and output the read display data to the USB general-purpose data transmission medium, and the fourth display interface component is configured to receive display data through calls to an operating system display API.

17. A computer according to claim 12, wherein the user mode display driver is configured to output the display data to the kernel mode display driver prior to starting of the user mode display service, and to the user mode display service after starting of the user mode display service.

18. A computer comprising:
a plurality of display interface components, each display interface component adapted to receive display data and transmit the display data via the general-purpose data transmission medium for output to the display, each display interface component associated with a different respective stage of operation of the computer, wherein at least a first display interface component comprises a pre-Operating System (OS) display interface component, and at least a second display interface component comprises an OS display interface component configured to interface with the OS of the computer; and
wherein the computer is configured to use a respective one of the display interface components during each of a plurality of distinct operational stages of the computer, wherein the first display interface component is used at a pre-OS stage of operation prior to booting of an OS and the second display interface component is used at a stage of operation when the OS of the computer has been booted, wherein operation of the computer is under control of firmware during the pre-OS stage, the firmware being configured to use the pre-OS display interface component for outputting display data,
the computer further comprising a display adapter connected to the USB general-purpose data transmission medium, wherein the display interface components are configured to output display data to the display adapter over the USB general-purpose data transmission medium, the display adapter configured to output a display signal to the display based on received display data.

19. A computer according to claim 18, wherein the display adapter is configured to maintain an output image on the display during transition from one display interface component operating during one operational stage to a different display interface component operating during a different operational stage, wherein the output image is preferably a static image during the transition and/or is an output image previously transmitted to the display adapter.

* * * * *